US007818499B2

(12) United States Patent
Arakawa et al.

(10) Patent No.: US 7,818,499 B2
(45) Date of Patent: Oct. 19, 2010

(54) METHODS AND APPARATUSES FOR HEAT MANAGEMENT IN STORAGE SYSTEMS

(75) Inventors: Hiroshi Arakawa, Sunnyvale, CA (US); Yoshiki Kano, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 11/898,948

(22) Filed: Sep. 18, 2007

(65) Prior Publication Data

US 2009/0077328 A1 Mar. 19, 2009

(51) Int. Cl.
*G06F 12/16* (2006.01)
*G01K 1/12* (2006.01)

(52) U.S. Cl. ....................... 711/114; 711/155; 711/161; 702/132

(58) Field of Classification Search ....................... None
See application file for complete search history.

(56) References Cited

U.S. PATENT DOCUMENTS 6,987,673 B1 1/2006 French et al.
7,505,264 B2 * 3/2009 Hall et al. .............. 361/679.33
2003/0110012 A1 6/2003 Orenstien et al.
2006/0069886 A1 * 3/2006 Tulyani ....................... 711/161
2006/0112286 A1 * 5/2006 Whalley et al. ............. 713/300
2006/0259793 A1 11/2006 Moore et al.

* cited by examiner

*Primary Examiner*—Than Nguyen
(74) *Attorney, Agent, or Firm*—Mattingly & Malur, P.C.

(57) ABSTRACT

An information system includes a storage system having a controller in communication with a plurality of storage devices. In some embodiments, the storage devices are divided into at least a first group and a second group, with a first temperature sensor sensing a temperature condition for the first group, and a second temperature sensor for sensing a temperature condition for the second group. A heat distribution rule designates the first groups to be high temperature groups and the second groups to be low temperature groups. The heat distribution rule is implemented by designating a higher load of input/output (I/O) operations to the high temperature groups than to the low temperature groups, such as by migrating volumes having high I/O loads to the high temperature groups. In other embodiments, there are multiple storage systems, and each storage system is designated as a high temperature system or a low temperature system.

16 Claims, 14 Drawing Sheets

201, 2011, 2012, 2013, 2014, 2015

| Parity Group ID | Number of Disks | RAID type | Disk ID | Capacity (GB) |
|---|---|---|---|---|
| 1-1 | 2 | RAID1 | 1-1 | 1024 |
| | | | 1-2 | 1024 |
| 1-2 | 2 | RAID1 | 1-3 | 1024 |
| | | | 1-4 | 1024 |
| 2-1 | 2 | RAID1 | 2-1 | 1024 |
| | | | 2-2 | 1024 |
| 2-2 | 2 | RAID1 | 2-3 | 1024 |
| | | | 2-4 | 1024 |
| : | : | : | : | : |

FIG. 3 Parity Group Information 202, 2021, 2022, 2023

| Volume ID | Type | Access Load | | | |
|---|---|---|---|---|---|
| | | 6/25/2007 7:00am~ 8:00am | 6/25/2007 8:00am~ 9:00am | 6/25/200 7 9:00am~ 10:00am | ... |
| 1 | iops | 10314 | 12072 | 11305 | ... |
| | MB/s | 40 | 48 | 44 | ... |
| 2 | iops | 20474 | 21234 | 22111 | ... |
| | MB/s | 80 | 84 | 88 | ... |
| : | : | : | : | : | ... |

FIG. 4 Access Information

203

| Parity Group ID (2031) | Volume ID (2032) | Start Address (LBA) (2033) | Capacity (MB) (2034) |
|---|---|---|---|
| 1-1 | 2 | 0 | 102400 |
| | Unused | 209715200 | 307200 |
| | 4 | 838860800 | 204800 |
| | Unused | 1258291200 | 102400 |
| | : | : | : |
| 1-2 | Unused | 0 | 204800 |
| | 3 | 419430400 | 204800 |
| | 7 | 838860800 | 102400 |
| | Unused | 1048576000 | 307200 |
| | : | : | : |
| : | : | : | : |

FIG. 5 Volume Information 204, 2041, 2042, 2043

| Area Name | Condition | Parity Group ID |
|---|---|---|
| Low | T < A | 1-1, 1-3, 1-5, ...<br>2-2, 2-4, 2-6, ...<br>3-1, 3-3, 3-5, ... |
| High | A =< T | 1-2, 1-4, 1-6, ...<br>2-1, 2-3, 2-5, ...<br>3-2, 3-4, 3-6, ... |

FIG. 7 Area Information

205

2051 2052

| Parity Group ID | Temperature (C) | | | | |
|---|---|---|---|---|---|
| | 6/25/2007 8:00am | 6/25/2007 9:00am | 6/25/2007 10:00am | 6/25/2007 11:00am | ... |
| 1-1 | 20 | 22 | 23 | 23 | ... |
| 1-2 | 30 | 30 | 30 | 30 | ... |
| 2-1 | 31 | 30 | 31 | 30 | ... |
| 2-2 | 24 | 23 | 22 | 22 | ... |
| : | : | : | : | : | ... |

FIG. 9 Heat Information

206

2061 2064 2065 2062 2066 2063

| Volume ID | Destination | | | Copy pointer (LBA) |
|---|---|---|---|---|
| | Parity Group | Start Address (LBA) | Capacity (MB) | |
| 2 | 1-2 | 0 | 102400 | 2000 |
| 3 | 2-2 | 419430400 | 204800 | 102400 |
| : | | | : | : |

FIG. 12 Migration Information

204'

| Area Name (2041) | Condition (2042) | Parity Group ID (2043) |
|---|---|---|
| Low | T < A | 1-1, 1-2, 1-3<br>2-1, 2-2, 2-3<br>3-1, 3-2, 3-3<br>... |
| High | A =< T | 1-4, 1-5, 1-6<br>2-4, 2-5, 2-6<br>3-4, 3-5, 3-6<br>... |

FIG. 14 Additional Area Information

205'

2051 2053 2052

| Parity Group ID | Type | Temperature (C) | | | | |
|---|---|---|---|---|---|---|
| | | 6/25/2007 7:00am~ 8:00am | 6/25/2007 8:00am~ 9:00am | 6/25/2007 9:00am~ 10:00am | 6/25/2007 10:00am~ 11:00am | ... |
| 1-1 | Max | 20 | 23 | 24 | 23 | ... |
| | Min | 20 | 21 | 23 | 23 | ... |
| | Ave | 20 | 22 | 23 | 23 | ... |
| 1-2 | Max | 31 | 30 | 30 | 30 | ... |
| | Min | 29 | 30 | 30 | 30 | ... |
| | Ave | 30 | 30 | 30 | 30 | ... |
| 2-1 | Max | 31 | 30 | 31 | 31 | ... |
| | Min | 31 | 29 | 31 | 29 | ... |
| | Ave | 31 | 30 | 31 | 30 | ... |
| 2-2 | Max | 24 | 23 | 23 | 23 | ... |
| | Min | 24 | 23 | 21 | 22 | ... |
| | Ave | 24 | 23 | 22 | 22 | ... |
| : | : | : | : | : | : | ... |

FIG. 17 Additional Heat Information

203'

2035 2032 2034

| Node ID | Volume ID | Capacity (MB) |
| --- | --- | --- |
| 1-1 | 2 | 102400 |
| | 4 | 307200 |
| | 9 | 204800 |
| | : | : |
| | Unused | 3072000 |
| 1-2 | 1 | 204800 |
| | 3 | 204800 |
| | 7 | 102400 |
| | : | : |
| | Unused | 4096000 |
| : | : | : |

FIG. 19 Volume Information

204"

| Area Name (2041) | Condition (2042) | Node ID (2044) |
|---|---|---|
| Low | T < A | 1-1, 1-3, 1-5, ...<br>2-2, 2-4, 2-6, ...<br>3-1, 3-3, 3-5, ...<br>... |
| High | A =< T | 1-2, 1-4, 1-6, ...<br>2-1, 2-3, 2-5, ...<br>3-2, 3-4, 3-6, ...<br>... |

FIG. 21 Area Information

204'''

| Area Name (2041) | Condition (2042) | Node ID (2043) |
|---|---|---|
| Low | T < A | 2-1, 2-2, 2-3, ...<br>3-1, 3-2, 3-3, ...<br>... |
| High | A =< T | 1-1, 1-2, 1-3, ... |

FIG. 23 Area Information

METHODS AND APPARATUSES FOR HEAT MANAGEMENT IN STORAGE SYSTEMS

BACKGROUND OF THE INVENTION

1. Field of the Invention

The present invention relates generally to information systems and data storage systems.

2. Description of Related Art

A number of factors are significantly increasing the cost of, operating data centers and similar information facilities. These factors include constantly increasing demands for additional data storage capacity, increasing demand for processing capacity, rising energy prices, and computers and storage systems that are consuming more electricity and that are requiring greater cooling capacity. Consequently, there has been a rapid growth in the density and power consumption of equipment at data centers and other such facilities. To attempt to deal with these factors, a patchwork of solutions has been adopted. For example, some businesses try to pack equipment more densely into a single area to better use available floor space, while others try to spread out the equipment to reduce overheating problems. Nevertheless, if current trends continue, many data centers will soon have insufficient power and cooling capacity to meet their needs due to the increasing density of equipment and rapid growth in the scale of the data centers.

Maintaining an appropriate temperature in computer equipment in high-density data storage and processing environments is needed to avoid failure of this equipment. Because air conditioning and circulation to cool equipment accounts for approximately one half of the electric power consumed in a typical data center, one solution for decreasing electricity consumption is through better management of the heat generated by the computer equipment and through more efficient cooling of the equipment in the data center.

Related art includes U.S. Pat. No. 6,987,673, to French et al., entitled "Techniques for Cooling a Set of Circuit Boards within a Rack Mount Cabinet", the entire disclosure of which is incorporated herein by reference. However, the prior art does not disclose technology for managing and controlling locations of heat sources in storage systems. The management and control of the amount of heat generated at specific locations in a data center having such storage systems would aid in achieving more efficient cooling in the data center, and thereby reduce the amount of electricity consumed in the data center. In other words, there is a need for better methods of managing and controlling heat distribution in facilities having a high density of computer equipment.

BRIEF SUMMARY OF THE INVENTION

The invention provides methods and apparatuses for heat management of storage systems, and the like, located in data centers and other types of facilities. In order to realize efficient cooling, rules may be specified for the facility according to the design of the facility and according to the arrangement of equipment and cooling systems in the facility. When a system in the facility detects a heat distribution that varies from a rule, the system is able to adjust the heat distribution, thereby achieving more efficient cooling and power consumption. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an exemplary data structure of parity group information.

FIG. 4 illustrates an exemplary data structure of access information.

FIG. 5 illustrates an exemplary data structure of volume information.

FIG. 7 illustrates an exemplary data structure of area information.

FIG. 9 illustrates an exemplary data structure of heat information.

FIG. 12 illustrates an exemplary data structure of migration information.

FIG. 14 illustrates another exemplary data structure for area information.

FIG. 17 illustrates another exemplary data structure of heat information.

FIG. 19 illustrates an exemplary data structure of volume information in the second embodiment.

FIG. 21 illustrates an exemplary data structure of area information in the second embodiment.

FIG. 23 illustrates another exemplary data structure of area information.

DETAILED DESCRIPTION OF THE INVENTION

Figure 1:
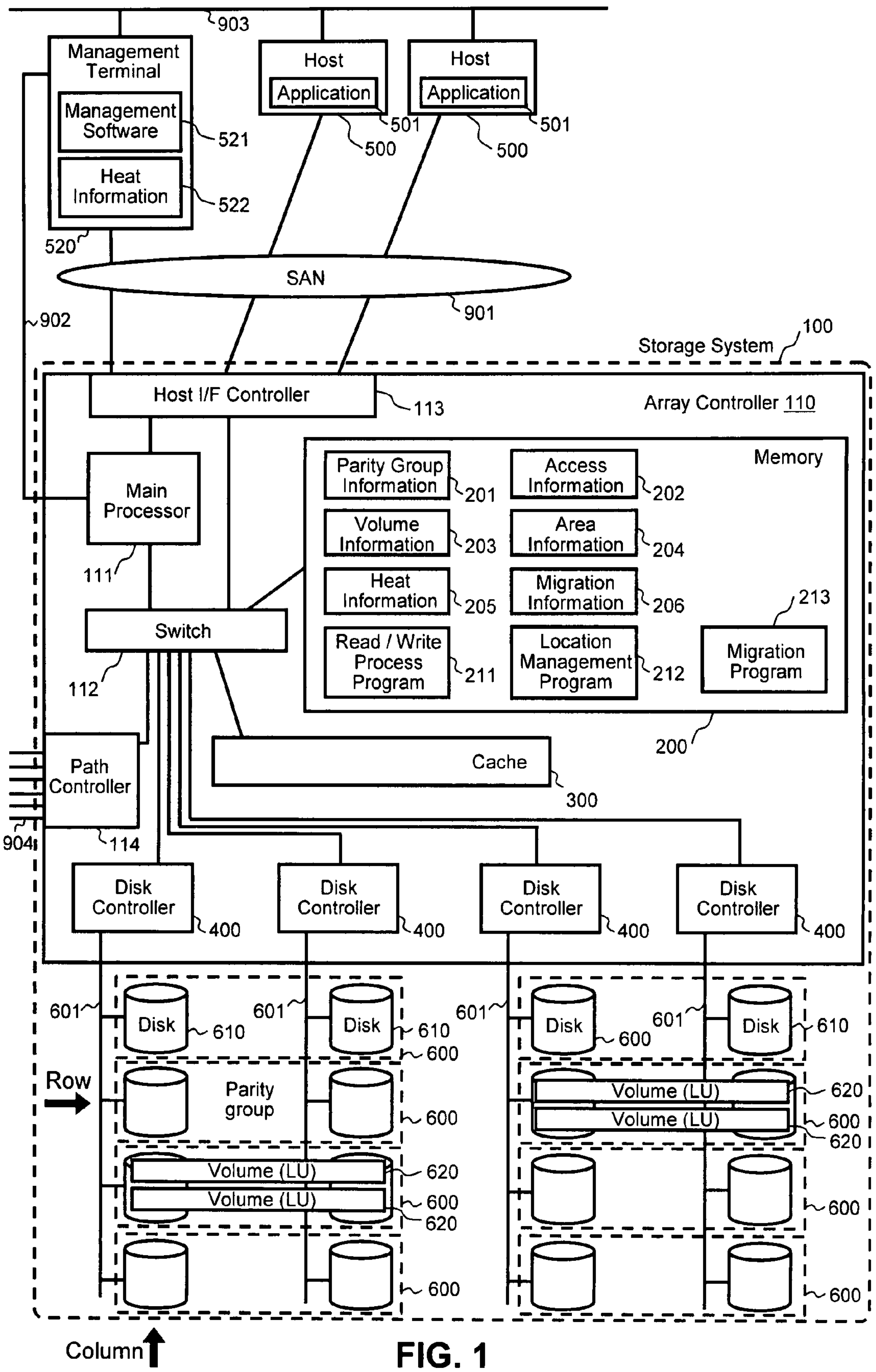
FIG. 1 illustrates an example of a system configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Embodiments of the invention disclose an information system that includes one or more host computers, a management terminal and one or more storage systems having a heat measurement means, a volume migration means and a volume location management means. For example, a hard disk drive (HDD) that has a high access frequency generates more heat in a storage system in comparison with a HDD that has a low access frequency because the former requires continuous running of the motors for the spindle and head arms, while the latter can stop or slow down. Thus, embodiments of the invention establish rules for heat distribution in the storage system based upon access frequency or other data configuration and distribution metrics. In order to realize efficient cooling, a user or manager of an information systems facility can specify one or more rules according to the design of the facility and the arrangement of equipment and cooling systems in the facility.

For example, under some embodiments, when the storage system detects a heat distribution in the system that varies from the rule, the storage system is able to automatically adjust the heat distribution by changing the physical location of volumes in the storage system, thereby increasing the cooling efficiency and reducing power consumption. Furthermore, in some embodiments the management of heat distribution is performed among multiple storage systems (nodes). The user or the manager can specify a rule of heat distribution for multiple storage systems in the same facility. When one of the storage systems detects a variation of heat distribution from the rule, the storage system can adjust the heat distribution by changing the physical location of volumes within the multiple storage systems, which enables optimization of heat distribution through out the facility, based on one or more rules. Additionally, some embodiments of the invention include a process for managing allocation of a new volume for achieving better heat distribution management.

First Embodiments

System Configuration

FIG. 1 illustrates an information system configuration in which first embodiments of the invention may be applied. The information system of FIG. 1 includes one or more storage systems 100 in communication with one or more host computers 500 and a management terminal 520. Storage system 100 includes an array controller 110 for controlling access and storage of data to a plurality of storage devices, which are hard disk drives (HDDs) 610 in the preferred embodiment. However, in other embodiments, the storage devices may also be solid state devices, optical devices, or the like. Array controller 110 includes a main processor 111, a switch 112, a host interface 113, a path controller 114, a memory 200, a cache 300, and one or more disk controllers 400 for communicating with disk drives 610 via a backend path 601. Backend path 601 may utilize SCSI on Fibre Channel, SATA, SAS, iSCSI, or the like.

Main processor 111 performs various processes on the array controller 110, such as processing input/output (I/O) operations received from host computers 500, storing data to and retrieving data storage devices 610, and other storage system management functions. Main processor 111 and other components of storage system 100 use a plurality of programs and data structures for carrying out the invention, which may be stored in memory 200 or other computer readable medium. The data structures include parity group information 201, access information 202, volume information 203, area information 204, heat information 205, and migration information 206, each of which is described further below. Main processor 111 performs the processes of the invention by executing one or more programs stored in memory 200 or other computer readable medium, and which include a read/write process program 211, a location management program 212, and a migration program 213, each of which is described further below.

Hosts 500 and management terminal 520 are connected for communication with host interface 113 via a storage area network (SAN) 901, which may be Fibre Channel, iSCSI(IP), or other network type. Hosts 500 and management terminal 520 are connected for communication with each other via a local area network (LAN) 903, which may be Ethernet or other network type. Management terminal 520 may also be connected to array controller 110 via an out-of-band (management) network 902, which may be Internet Protocol or other network type, and which may be the same as LAN 903, or a separate network. Storage system may also have a path controller 114 to be connected by a node network 904 explained in the second embodiment. To have capability as computers, hosts 500 and management terminal 520 each have typical computing resources, such as a processor and a memory (not shown in FIG. 1). Each host 500 may include application software 501 for sending I/O requests to storage system 100, and may also include operating system software, a file system, and the like (not shown). In addition, management terminal 520 includes management software 521, and may also include heat information 522, which are described further below.

A plurality of logical volumes 620 (logical units) may be provided by storage system 100 as storage resources, such as for use by hosts 500 for storing application data, or the like. Volumes 620 are created from a collection of physical storage areas in HDDs 610. Volumes 620 may be protected by storing parity code, i.e., by using a RAID (Redundant Array of Independent Disks) configuration for volumes formed over a collection of multiple disk drives 610. Such a collection of disk drives 610 in a RAID configuration that can be used to provide one or more volumes is referred to as an array group or parity group 600. In the embodiments of the invention, various parity group configurations (RAID configurations) and various numbers of disks in each parity group can be applied depending on administrative preferences, intended use of the storage system, and the like. A host 500 is able to store data in one or more of volumes 620, and utilize the data in the volume. In other words, host 500 is able to write data to a volume 620 and read data from the volume 620 for running the application 501 on host 500.

Figure 2:
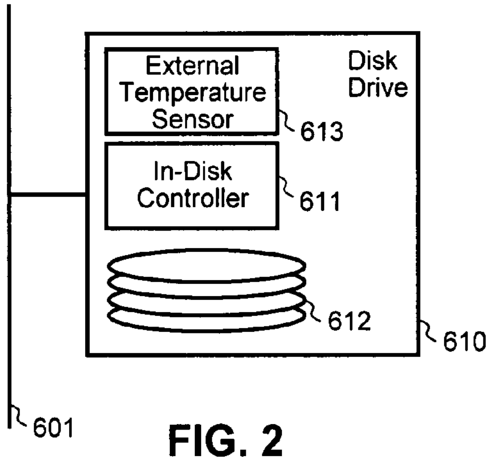
FIG. 2 illustrates an example of a storage device configuration of the invention that may be used in the architecture of FIG. 1.

As illustrated in FIG. 2, one or more of disk drives 610 according to the invention may include an external temperature sensor 613 in addition to an in-disk controller 611, and magnetic storage media 612. For example, according to some embodiments, one disk drive in each parity group may be equipped with external temperature sensor 613. In-disk controller 611 processes read and write requests received from disk controller 400 and transfers data from or stores data to magnetic media 612 according to the read and write requests, respectively. Moreover, in-disk controller 611 obtains information regarding the temperature in the vicinity of disk drive 610 from the external temperature sensor 613, and sends this temperature information to array controller 110. As another example of a configuration, the temperature sensor 613 may be located on other equipment close to a parity group, for example within a parity group enclosure or other location within storage system 100, and transmit the temperature information to the array controller 110 regarding the temperature of a particular parity group or other disk, disk group, individual storage cabinet, or the like, within the storage system.

Array controller 110 manages parity groups 600 within storage system 100 by referring to parity group information 201. FIG. 3 illustrates an example of a data structure of parity group information 201. As illustrated in FIG. 3, parity group information 201 may include a parity group identifier (ID) 2011, a number of disks 2012 in each parity group 600, a type of disk configuration (RAID type) 2013, a disk ID 2014 for identifying individual disks in each parity group 600 and a capacity 2015 of each disk.

In order to provide volumes to each host 500, array controller 110 maintains access information 202 and volume information 203. Array controller 110 receives an I/O operation, such as a read or write command, from host 500 via SAN 901 and reads data from or stores data in a volume targeted by the command. In addition, array controller 110 records and maintains an amount of read and write accesses (i.e., the access load) in access information 202.

FIG. 4 illustrates an example of a data structure of access information 202. Access information 202 includes a volume ID 2021, a load measurement type 2022 and an access load 2023 measured for the volume according to one or more of the load measurement types. For example, in FIG. 4, the access load for each volume is expressed by average number of accesses and amount of data transferred per unit time. Namely, average I/O operations per second (iops) and average MB transferred per second (MB/s) over the course of an hour may be recorded for each volume in access information 202.

FIG. 5 illustrates an example a data structure of volume information 203. As illustrated in FIG. 5, volume information 203 includes a parity group ID 2031 that identifies in which parity group the volume is formed, a volume ID 2032, a start logical block address (LBA) 2033 and a capacity 2034 allocated for the volume. Volume information 203 maintains a mapping between each volume and a physical region of the volume in one of parity groups 600. Volume information 203 also maintains information about unused regions of each parity group 600. Array controller 110 is able to search for a volume or an unused region by using volume information 203.

Figure 6:
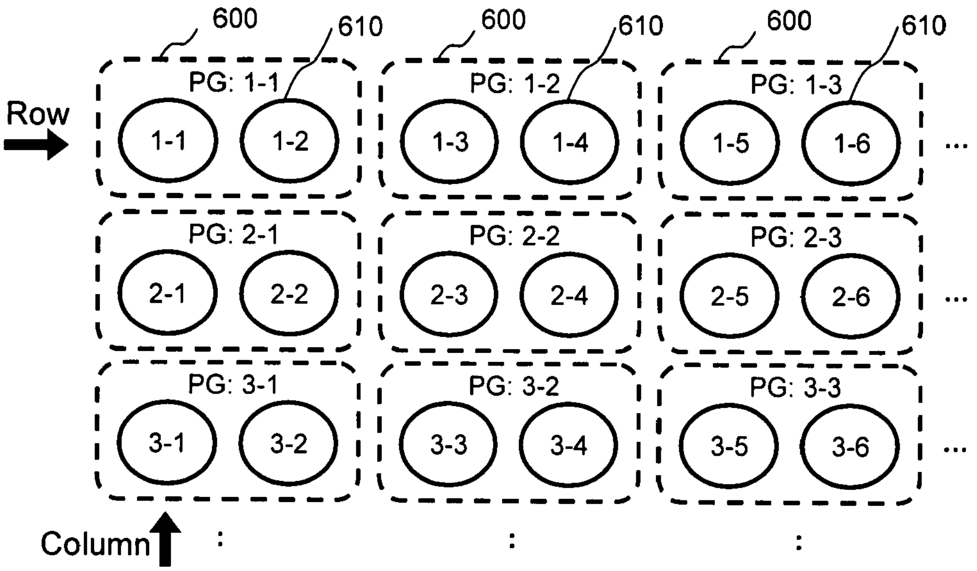
FIG. 6 illustrates an exemplary physical configuration of a parity group.

In some embodiments of the invention, the physical location of each parity group 600 in storage system 100 can be specified according to “row” and “column”. FIG. 6 illustrates an example of a physical configuration of parity groups 600 showing their locations relative to each other. FIG. 6 also illustrates the relation between a physical location of each parity group 600 and the row/column (i.e., row and column location). For example, a row of parity group 1-2 is “row 1”, and the column of parity group 1-2 is “column 2”.

Array controller 110 can implement a rule for heat distribution among all parity groups 600 by using area information 204. FIG. 7 illustrates an example of a data structure for area information 204. In the embodiment of FIG. 7, parity groups 600 are divided into one of two areas (i.e., “High” or “Low”), as entered in area name field 2041. Regarding a condition 2042 in area information 204, “T” indicates a target temperature of each parity group 204 and “A” indicates a boundary of the temperature determined from average temperature of all parity groups 600. Array controller 110 can determine (i.e., calculate) the average temperature “A” used as a boundary by referring to heat information 205 described below that is collected for each of the parity groups, and then determine the average temperature for all the parity groups. The rule of FIGS. 7 and 8A-8B enables half of the parity groups to be above the average temperature and half below, thereby normalizing the temperatures of all the parity groups. Parity group ID 2043 in the area information 204 indicates the parity group 600 belonging to each area 2041.

Figure 8A:
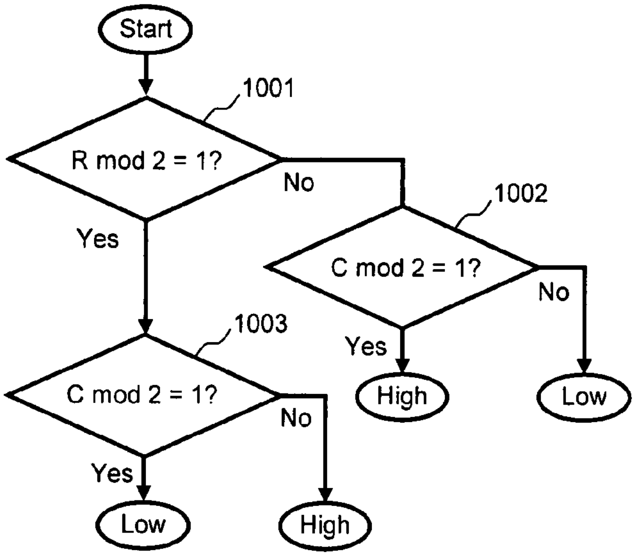
FIGS. 8A-8B illustrates an exemplary process for applying a rule to parity groups and the resulting heat distribution configuration.
Figure 8B:
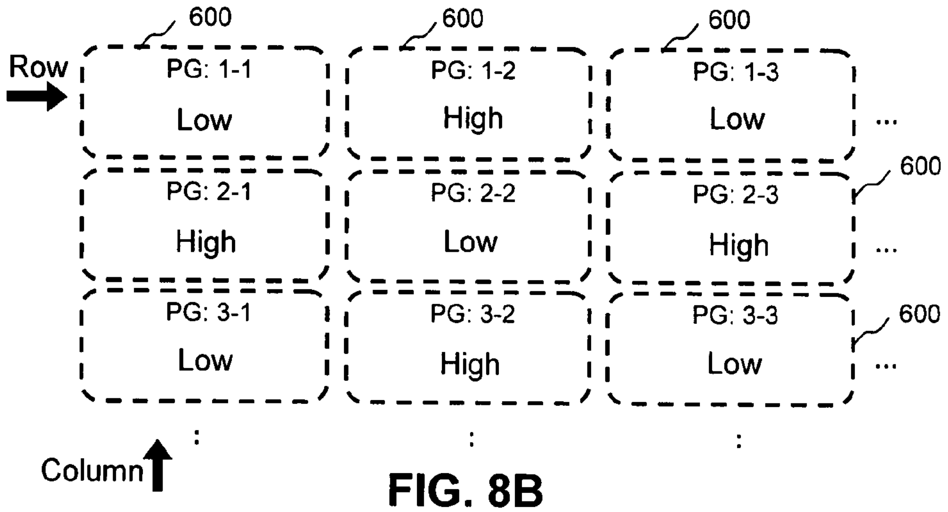

In this example, the area that each parity group 600 belongs to is determined by a rule, the process of which is illustrated in FIG. 8A. In FIG. 8A, “R” means the row of the parity group 600 and “C” means column of the parity group 600. As illustrated in FIG. 7 and FIGS. 8A-8B, in this example, arrangement of “High” parity groups 600 and “Low” parity groups 600 are equalized or homogenized. As discussed later, this achieves equalization of the heat distribution (i.e., temperature) within the storage system. For example, step 1001 determines whether row mod 2=1. The process then goes to either step 1002 or step 1003 to determine if the column mod 2=1. The result is that a YES, YES answer or a NO, NO answer means that the parity group is classified as a “Low” temperature area, while a YES, NO answer or a NO, YES answer means that the parity group is classified as a “High” temperature area.

In the particular example illustrated in FIGS. 7 and 8A-8B, the rule results in a checker board pattern as illustrated in FIG. 8B, in which “Low” temperature areas are bounded by “High” temperature areas, and vice versa. In other rules or system arrangements, other patterns may be more efficient, such as having “High” areas on the outside locations and “Low” areas in the center locations. For a cooled environment like a data center or other facility using a general air-cooling method, uneven distribution of heat causes inefficiency because over-cooling in one or more portions of the overall area is necessary in order to keep the hottest areas at a certain minimum temperature. On the other hand, by the arrangement illustrated in FIG. 8B in which each high temperature parity group is bounded by low temperature parity groups, and vice versa, the heat distribution is equalized across the storage devices making up the parity groups. Equalization of heat distribution across all the components avoids the inefficiency mentioned above, and achieves more efficient cooling since the overall cooling load is decreased. This also avoids localized failures of one or more of disk drives 600 due to a localized high temperature. Furthermore, as an alternative method, the boundary temperature “A” may be specified by a user from management terminal 520 rather than being calculated by array controller 110.

Monitoring of Temperature

As discussed above, array controller 110 collects temperature information of each disk drive 600 or parity group 600. Array controller 110 records and maintains the temperature information in heat information 205. FIG. 9 illustrates an example of a data structure of heat information 205. As illustrated in FIG. 9, array controller 110 records the temperature of each parity group 600 at predetermined time intervals by gathering or receiving input from temperature sensors 613. A user can specify the interval time for collecting the temperature information via management terminal 520. Array controller 110 may acquire temperature of a parity group 600 by taking the average of temperature of disk drives 610 that belong to the parity group 600, or a single temperature sensor 613 may be allocated to each parity group, or the like. Heat information 205 may be transferred to management terminal 520 and displayed to a user as heat information 522 in order to facilitate or enable some user decisions.

Process for Maintaining Proper Distribution of Heat

Figure 10:
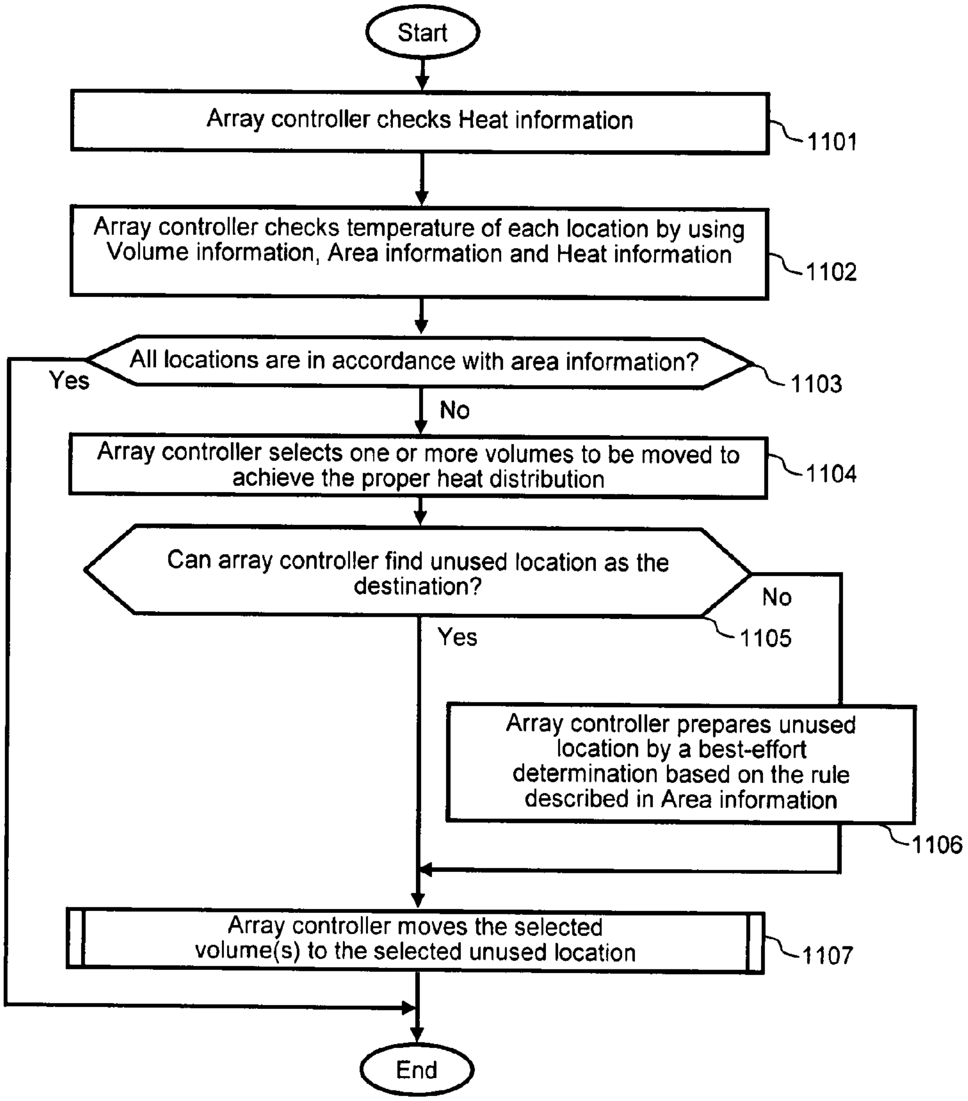
FIG. 10 illustrates an exemplary process carried out for achieving efficient heat distribution.

FIG. 10 illustrates an exemplary process for maintaining a desirable heat distribution in the storage system 100. By following the process described in FIG. 10, storage system 100 can achieve proper heat distribution according to the rule defined by area information 204, so that hot spots are avoided.

At step 1101, array controller 110 checks heat information 205 at a predetermined periodic interval, or in response to an alarm if one of temperature sensors 613 indicates a temperature above a predetermined temperature.

At step 1102, array controller 110 checks the temperature of each parity group 600 by using volume information 203, area information 204 and heat information 205. Array controller 110 verifies whether the condition described in area information 204 is preserved or not.

At step 1103, if the heat distribution based on the condition is maintained in accordance with the area information 204, then the process ends. If not, then the process goes to step 1104 to take corrective action.

At step 1104, array controller 110 selects one or more volumes to be moved to achieve the proper heat distribution. The details of this step are discussed further below.

At step 1105, array controller 110 seeks unused location as destinations for the volume(s) need to be moved to satisfy the condition. If array controller 110 is able to find unused locations that meet the requirements, the process proceeds to step 1107. On the other hand, if there are no unused locations that meet all the requirements, the process goes to step 1106.

At step 1106, array controller 110 selects an unused location as a destination of the volume by a best-effort determination based on the category described in area information 204. As one example of the best-effort determination, array controller 110 may select an unused location that can bring the heat distribution closer to the condition even if the condition is not satisfied. As another example, array controller 110 may decide not to perform any change (i.e. no operation) if there will be only minimal improvement.

At step 1107, array controller 110 moves the selected volume(s) to the selected unused location(s), and the process ends. The details of the migration process are described below.

At step 1104, when array controller 110 finds a "Low" parity group 600 (i.e., a parity group belonging to the "Low" area according to area information 204) that has a higher temperature than the condition specified for "Low" (i.e., "T" is not less than "A"), the array controller 110 selects the volume having the largest load in that parity group 600 by referring to access information 202. Then, at step 1105, array controller 110 selects an unused location in one of the "High" parity groups 600 (i.e., a parity group classified as being in the "High" area) as a target destination for migration of the volume. By moving the volume having the highest load (i.e., a generator of a large amount of heat due to a large amount of I/O operations) to a "High" parity group 600, the heat at the "Low" parity group is reduced, and instead the volume is located at a parity group that is allowed to have higher heat according to the heat distribution pattern established by the rule of FIGS. 7 and 8. Alternatively, instead of moving to the unused location, array controller 110 may swap the volume at the "Low" parity group with a volume having a low load in one of "High" parity groups 600 if the array controller 110 can find a volume having the same size (allocated capacity).

At step 1104, when array controller 110 finds a "High" parity group 600 (i.e., a parity group belonging to the "High" area according to area information 204) that has a lower temperature than the condition of "High", the array controller 110 may be configured to select the volume having the smallest load in the parity group 600 by referring to access information 202. Then, at step 1105, array controller 110 selects an unused location in one of the "Low" parity groups 600 (i.e., belonging to "Low" area according to area information 204) as a target destination for migration. By moving the volume at step 1107, an unused location is created in the particular "High" parity group 600, which means that a volume of high load can be migrated to the unused location. Therefore, the heat distribution is automatically adjusted to the distribution set forth by the rule, as illustrated in FIGS. 7 and 8A-8B. Alternatively, instead of just moving the low use volume to the unused location in one of the "Low" parity groups, array controller 110 may automatically swap the low-use volume with a volume having a high load that is located in one of the "Low" parity groups 600 if the array controller 110 is able to find such a volume having the same size (allocated capacity).

Furthermore, with regard to the interval for carrying out the periodic check of the system at step 1101, a user can specify the interval from management terminal 520, or change the interval as desired. With the above process, the management of heat distribution within storage system 100 according to the specified rule is achieved. As an alternative method, other units of area may be used instead of parity groups 600, and a large number of such variations are possible, depending on the location of disk drives within the storage system, and methods of volume creation, and the like. Moreover, as another alternative method, management software 521 may manage and instruct the adjustment of the locations of volumes by having the information mentioned above, and also by taking into account other factors, such as available capacity in each parity group, desired performance for particular volumes, and the like. Additionally, in some embodiments, instead of using parity groups, volumes might be formed on individual storage devices. In this case, one or more first storage devices might be designated as "high" temperature devices and one more second storage devices might be designated as "low" temperature devices. A heat distribution pattern and rule can be applied to such individual storage devices in the same manner as discussed above for parity groups.

Process of Volume Migration

Figure 11:
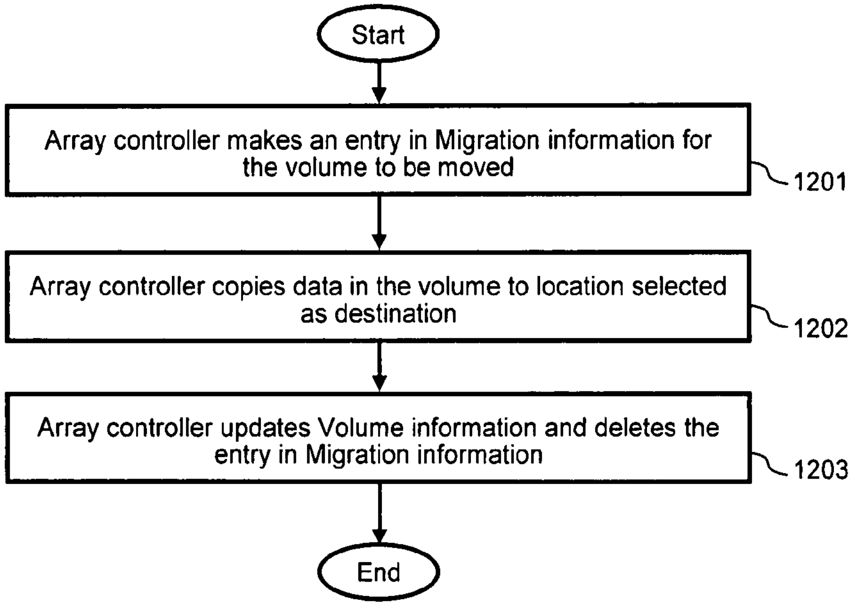
FIG. 11 illustrates an exemplary process for volume migration.

FIG. 11 illustrates an exemplary process of for carrying out the volume migration described above in order to normalize the heat distribution in the storage system. In carrying out the process, array controller 110 uses migration information 206. FIG. 12 illustrates an example of a data structure of the migration information 206. Migration information 206 includes a volume ID 2061 of the volume to be moved, destination information 2062 regarding the unused location selected as destination and copy pointer (LBA) 2063 that denotes progress of copy. The destination information 2062 includes parity group 2064, the start address (LBA) 2065 of the volume, and the capacity 2066 of the volume.

At step 1201, array controller 110 makes an entry in migration information 206 for the volume to be moved, including volume ID 2061, parity group 2064 of the destination, start address 2065 of the destination, and capacity 2066.

At step 1202, array controller 110 begins copying the data in the volume to the location selected as the destination. As the copying of the data progresses, copy pointer 2063 in migration information 206 is updated and moved forward.

At step 1203, after completion of the copying of the data to the destination, array controller 110 updates volume information 203 to change mapping between the volume and the physical location to which the volume was migrated. This results in a migration of the volume that is transparent to the host 500. After the volume information has been update, array controller 110 deletes the entry of the original volume from the volume information 203.

Process for Read/Write Access to the Volume During Migration

Figure 13:
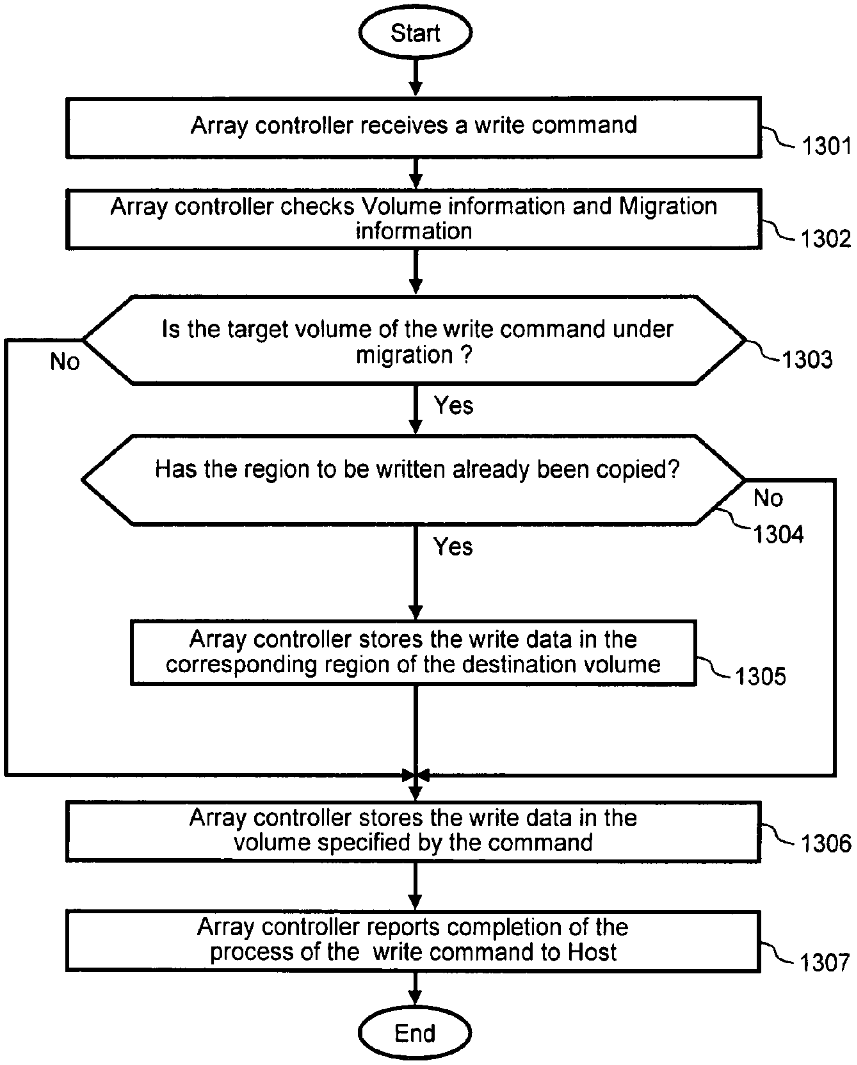
FIG. 13 illustrates an exemplary process for carrying out a write request to a volume under migration.

FIG. 13 illustrates an exemplary process for a write request carried out when the write request targets a volume that is being migrated.

At step 1301, array controller 110 receives a write operation from a host 500 via SAN 901.

At step 1302, array controller 110 refers to volume information 203 and migration information 206 to determine the volume mapping and to determine whether the volume is undergoing migration.

At step 1303, as a the result of referring to the volume ID 2061 recorded in migration information 206, array controller 110 can determine whether the volume that is the target of the write command is under migration, and, if so, the process proceeds to step 1304. On the other hand, if the target volume is not currently being migrated, the process goes to step 1306.

At step 1304, as a result of referring to the copy pointer 2063 in the migration information 206, array controller 110 can determine whether the targeted region to be written in the targeted volume has already copied as part of the migration process. If the targeted region of the volume has already been copied to the new area, the process goes to step 1305. If not, the process goes to step 1306.

At step 1305, array controller 110 stores the received write data in the corresponding region of the destination volume. The write data is transferred from host 500 via SAN 901, and may be stored in cache 300 temporarily before storing to the destination volume.

At step 1306, array controller 110 stores the write data in the volume specified by the command.

At step 1307, array controller 110 reports completion of the process of the write command to the host 500. Thus, by carrying out the above process, the write data is stored in the both the specified target volume and the destination volume when the write command specifies a portion of the volume that has already been copied in a migration process.

For a read operation received from a host 500, array controller 110 receives the read request from host 500 via SAN 901, and refers to volume information 203 to determine the physical location of the target portion of the volume. For example, if the volume information shows that the volume is in the original parity group, then the migration has not been completed, and the data can be read from the original location. On the other hand, if the migration has completed, then volume information has been changed, and the volume information will map to the volume in the destination parity group. Array controller 110 obtains the data stored in the region specified in the read command, and transfers the data to the host 500 via SAN 901.

Additional Example of Area Information

Figure 15:
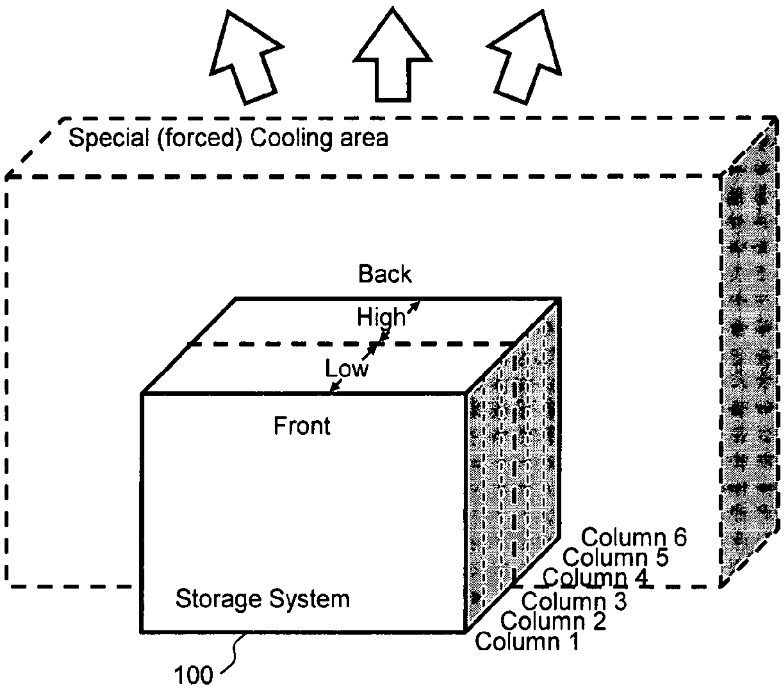
FIG. 15 illustrates an exemplary configuration for cooling of a storage system.
Figure 16:
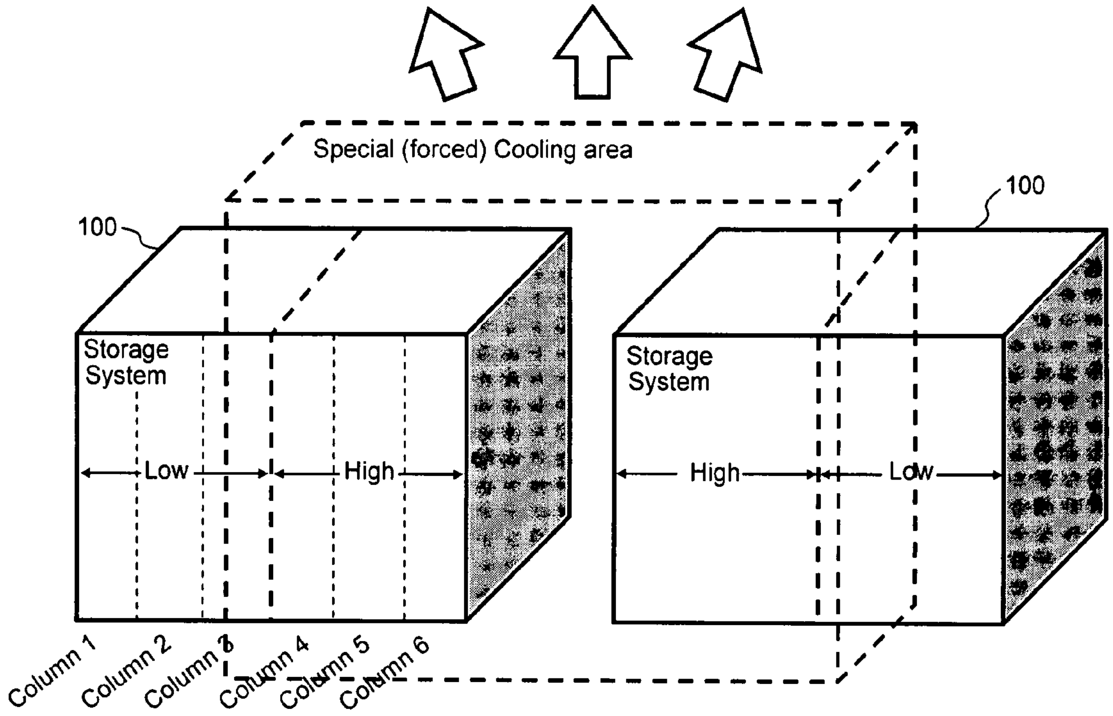
FIG. 16 illustrates an exemplary configuration for cooling of multiple storage systems.

FIG. 14 illustrates another example of a data structure of area information 204' according to another example of a rule of heat distribution. In FIG. 14, a series of columns belongs to "Low" parity groups 600 while another series of columns belongs to "High" parity groups 610. As illustrated in FIG. 15, this rule creates an intentional spatial localization of heat in which a portion of the parity groups are intended to generate a larger amount of heat than another portion of the parity groups. By directing concentrated cooling primarily at the parity groups intended to produce the most heat, this localization of heat production and concentrated cooling realizes a high efficiency of cooling with lower power consumption used for cooling. Additionally, FIG. 16 illustrates how the area information 204' of FIG. 14 can be applied to a plurality of storage systems 100 so that concentrated (forced) cooling air is directed through the parity groups designated for having a higher heat production, and not through the parity groups designated for having lower heat production, thereby achieving more efficient cooling of the entire system.

Additional Example of Heat Information

FIG. 17 illustrates another example of heat information 205'. In this heat information 205', a type field 2053 is included that contains entries for the maximum (highest) temperature, the minimum (lowest) temperature, and the average temperature measured over a predetermined period, which are recorded and maintained, instead of just the instantaneous temperature, as described above with reference to FIG. 9. By using management terminal 520, a user can choose the type of value to be used for the determination mentioned above in determining whether a particular parity group is in conformance to a specified rule for heat distribution.

Second Embodiment

System Configuration

Figure 18:
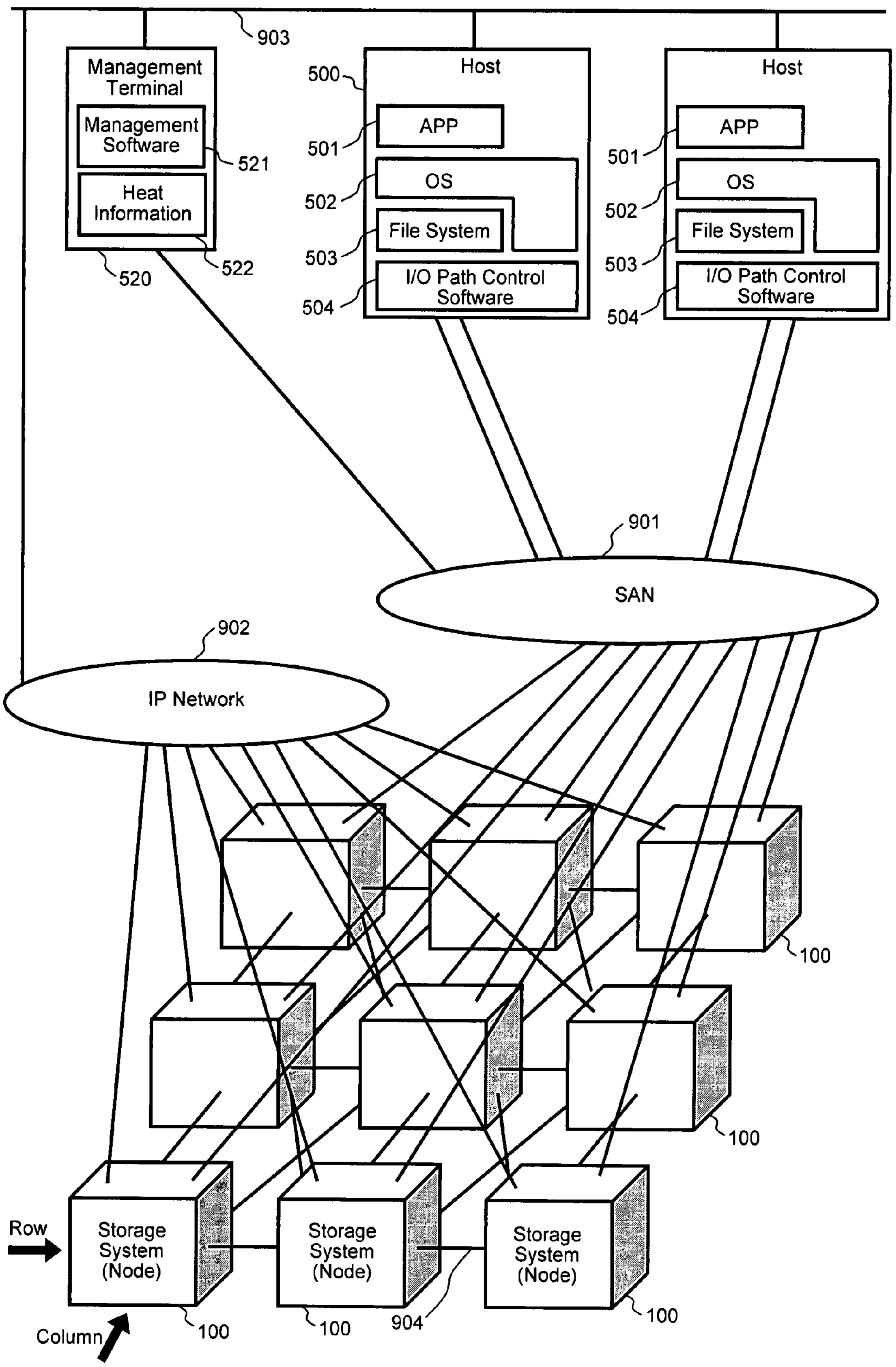
FIG. 18 illustrates an exemplary system configuration according to a second embodiment of the invention.

FIG. 18 illustrates an example of a system configuration in which second embodiments of the invention may be carried out. In the system configuration of FIG. 18, multiple storage systems 100 (also referred to as storage nodes) are connected for communication with each other via node network 904, which may be, for example, Fibre Channel, Internet Protocol, InfiniBand, or the like, and which is accessed through path controller 114 (see FIG. 1). Each of storage systems 100 can be configured to possess equivalent components, such as an array controller 110 (see FIG. 1) including data structures and programs discussed above for storage system 100 in the first embodiments, disk drives, and the like.

The storage systems 100 are also connected to hosts 500 and management terminal 520 via SAN 901 (e.g., Fibre Channel, iSCSI(IP)) and by out-of-band network 902 (e.g., Internet Protocol) and/or LAN 903 as described above in the first embodiments. In addition to application software 501, operating system 502 and file system 503, each host 500 includes I/O path control software 504.

Array controllers 110 on each of the storage systems 100 are able to receive read and write commands from a host 500 via SAN 901 and retrieve or store data according to the commands. In addition, each array controller 110 records and maintains an amount (i.e., the load) of read and write accesses in access information 202, as described above with respect to FIG. 4, so that each node is aware of which volumes have the highest and lowest access loads. Also, temperature sensors 613, as discussed in reference to FIG. 2 in the first embodiments are located on one or more disk drives 610, on other equipment or in enclosures of each storage system 100, and are configured to transmit temperature information to each array controller 110 of each storage system 100.

FIG. 19 illustrates an example of a data structure of volume information 203' in this embodiment. FIG. 19 illustrates a relation between storage nodes 100 and volumes that are located in the node, rather than identifying volume according to parity group as in the first embodiments. Thus, volume information 203' includes an entry 2035 for node ID, in addition to volume ID 2032 and capacity 2034.

Figure 20:
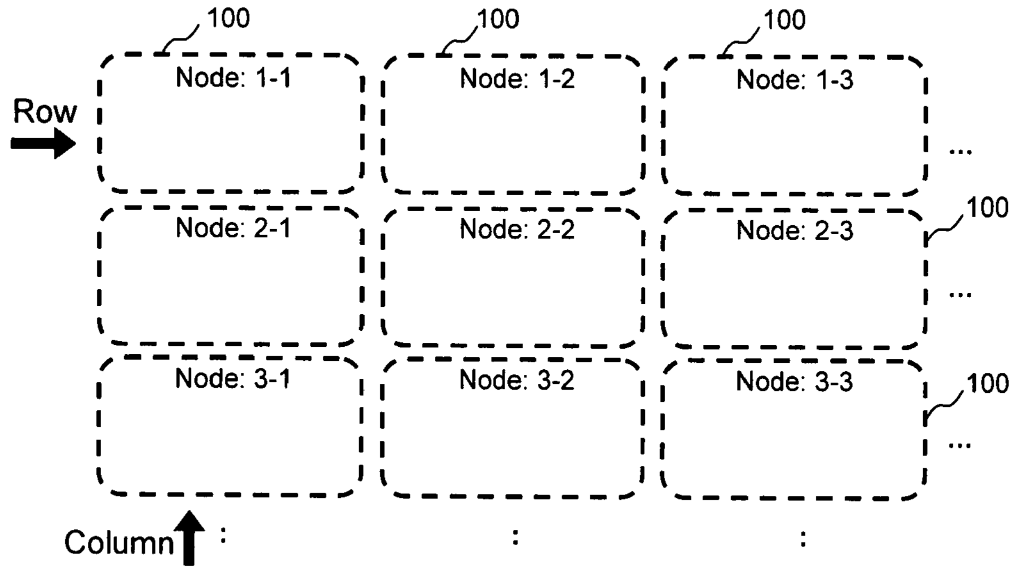
FIG. 20 illustrates an exemplary physical configuration of nodes in the second embodiment.

In this embodiment, a physical location of each storage system node 100 can be also specified by "row" and "column". FIG. 20 illustrates an example of a physical configuration (i.e., locations) of storage nodes. FIG. 20 also illustrates the relation between the physical location of each node and that node's row and column. For example, the row of Node 1-2 is row "1", and the column of Node 1-2 is column "2".

Area Information and Processes to Manage Distribution of Heat

At least one of the storage nodes 100 can have a rule for heat distribution among all the storage nodes 100 by using area information 204". For example, one node may be a management node configured to determine whether the heat distribution among the nodes 100 is in accordance with a specified rule. FIG. 21 illustrates an example of area information 204" that can be used in this embodiment, which includes a node ID entry 2044, in place of parity group entry 2043, according to assigned row and column. In FIG. 21, the storage nodes are divided into two areas, i.e., "High" and "Low" areas. Regarding condition 2042 in the area information 204", "T" indicates the target temperature of each node and "A" indicates the boundary of the temperature determined from the average temperature of all the storage nodes 100. One of array controllers 110 on one of nodes 100, such as a node designated as a management node, can determine (i.e., calculate) the boundary temperature "A" by referring to heat information 205 which is similar to that discussed above with respect to FIGS. 9 and 17, except that temperature information is collected per node instead of per parity group.

Figure 22:
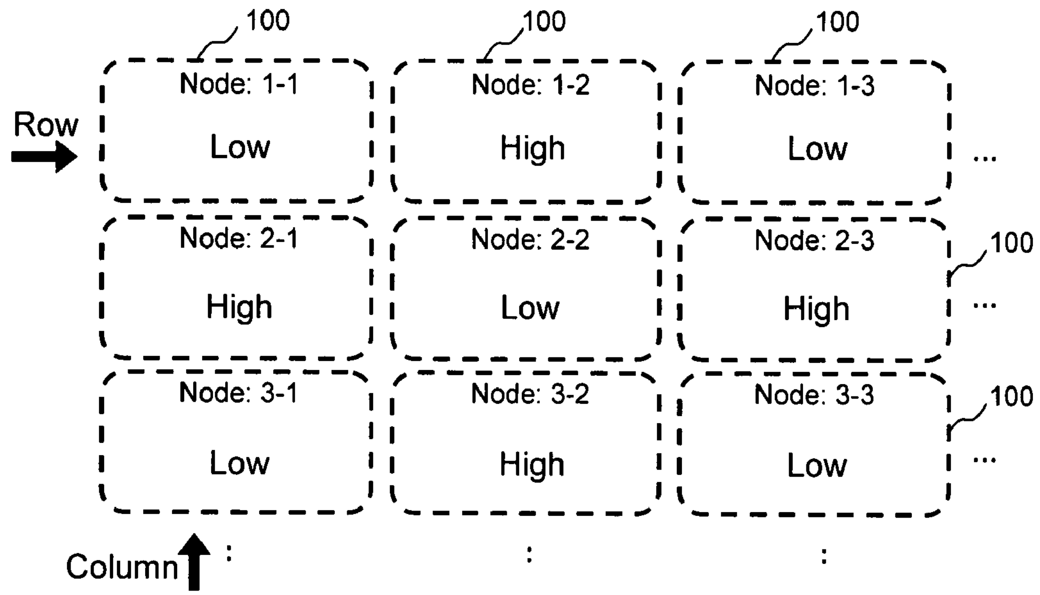
FIG. 22 illustrates the exemplary physical configuration of FIG. 20 in which the nodes are equalized.

As illustrated in FIG. 22, in this example, the arrangement of "High" nodes and "Low" nodes is equalized or normalized in a manner similar to that described above with reference to FIGS. 7 and 8A-B, by arranging in a checker board type of pattern of "High" temperature and "Low" temperature nodes 100. In addition to this information, by applying the heat distribution management processes described above for the first embodiments (including monitoring temperature and migration of volumes as discussed in FIG. 10) to nodes instead of to parity groups, equalization of heat distribution (i.e., temperature) among the storage nodes 100 is achieved. For example, if a particular storage system node designated as a "Low" temperature node has a temperature that is greater than "A", then that node will be instructed to transfer one or more volumes having high access loads to another node designated as a "High" temperature node that has sufficient capacity to accommodate the one or more volumes. As explained in the first embodiment, equalization of heat distribution avoids inefficiency caused by over-cooling areas that do not require it, thereby achieving more efficient overall cooling.

According to the above process, the management of heat distribution regarding multiple storage system nodes 100 according to the specified rule is achieved. As an alternative method, management software 521 on management terminal 520 may manage and instruct adjustment of the locations of volumes among the plurality of nodes 100 by receiving and processing the information mentioned above instead of carrying out this process on one of nodes 100. Moreover, I/O path control software 504 may be used to efficiently move the volumes and maintain proper communication paths between a host 500 and the correct array controller 110 for accessing the volumes used by a particular host 500.

Additional Example of Area Information

Figure 24:
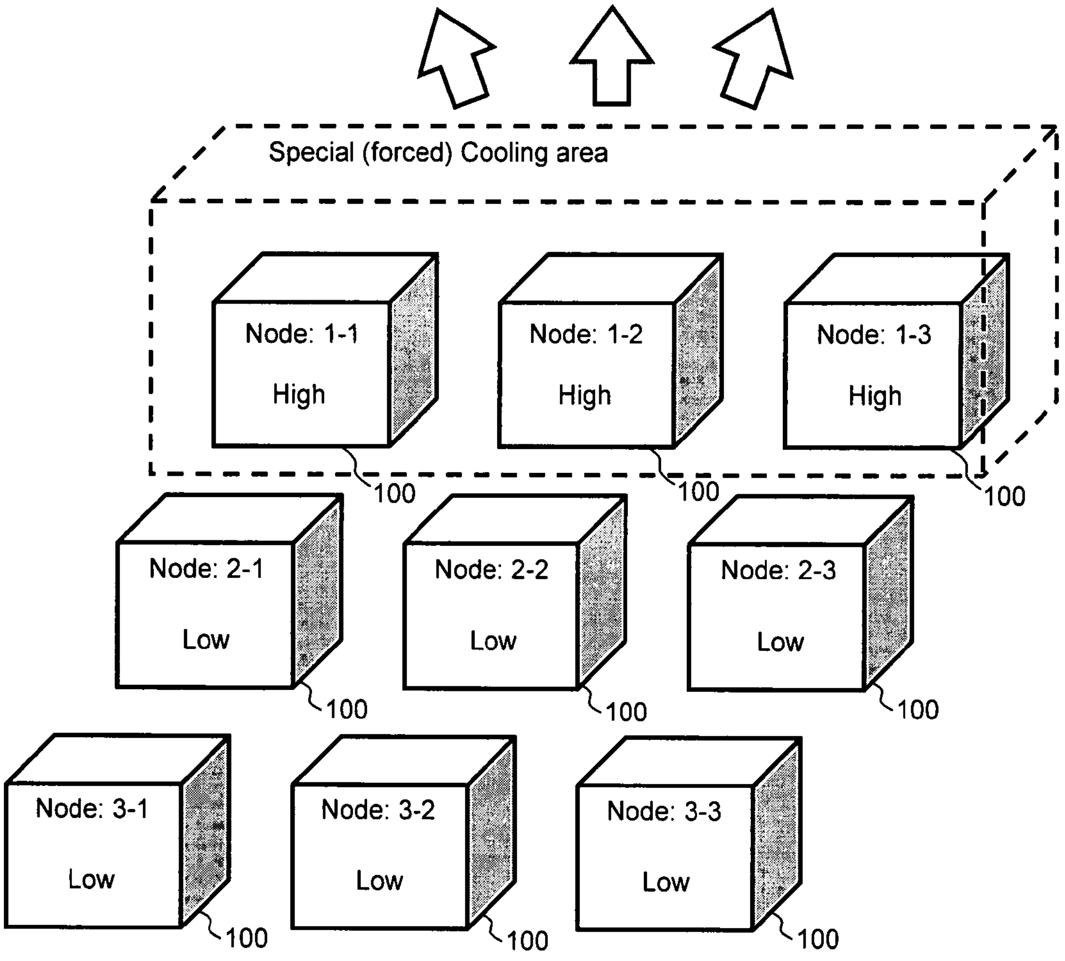
FIG. 24 illustrates an exemplary configuration for cooling of a storage system according to FIG. 22.

FIG. 23 illustrates another example of area information 204''' that illustrates another example of a rule of heat distribution that may be applied to the second embodiments. According to the area information 204''' of FIG. 23, a series of columns of nodes are designated as "Low" nodes while another series of columns of nodes are designated as "High" nodes, as illustrated in FIG. 24. The arrangement of FIG. 24 creates an intentional spatially-localized heat concentration. By concentrating cooling air on the heat concentration within a well-planned data center space, the localization of heating and cooling enables a greater efficiency in cooling the equipment that needs cooling, thereby resulting in reduced power consumption.

Third Embodiment

Figure 25:
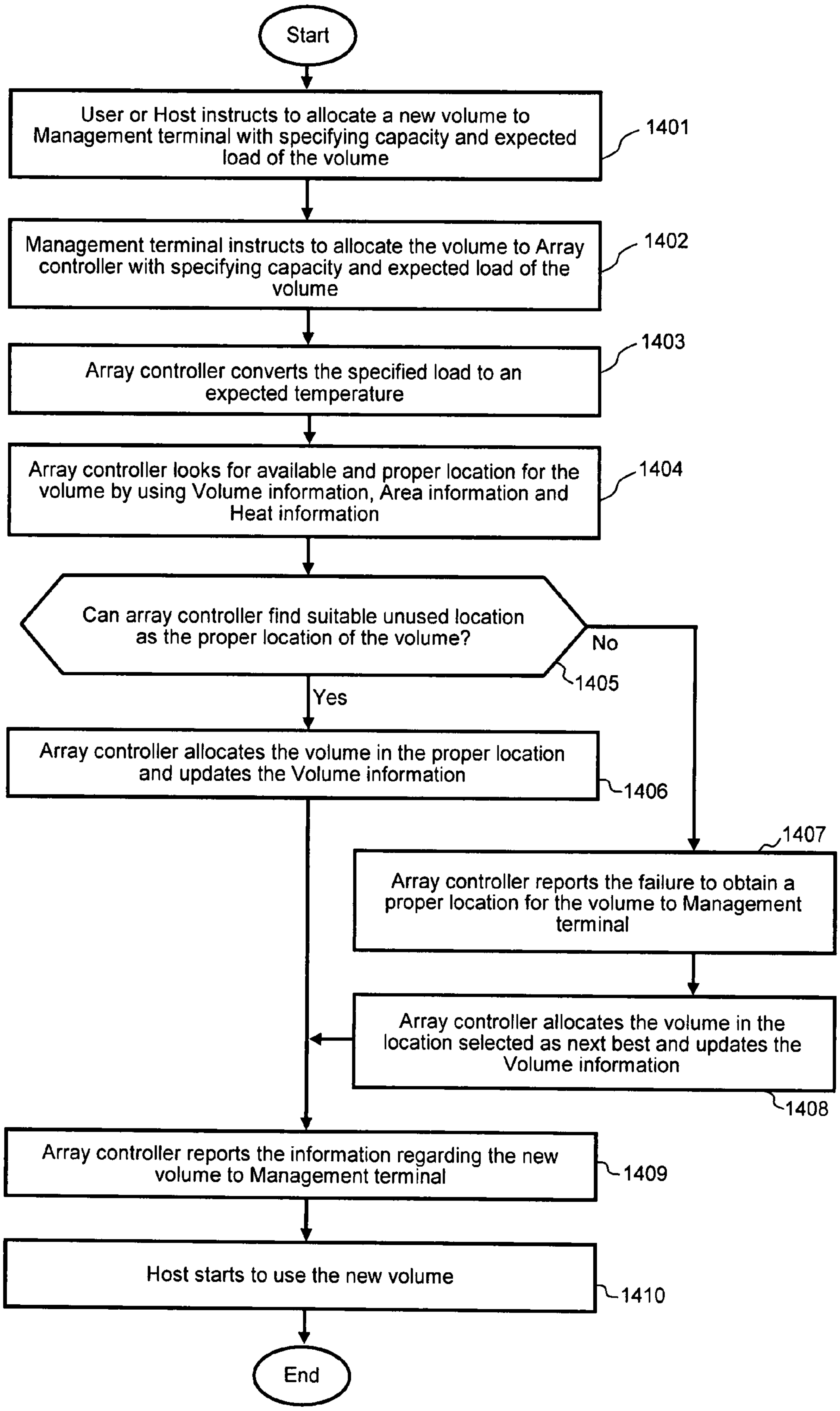
FIG. 25 illustrates an exemplary process for carrying out a third embodiment of the invention.

A rule of heat distribution described in area information 204 can be applied in allocating a new volume. FIG. 25 illustrates an example of a process to allocate a new volume. The system configuration in which the process of FIG. 25 is applied may be the system configuration described in the first embodiment or the second embodiment.

At step 1401, a user or host 500 instructs the allocation of a new volume to management terminal 520, including a specification for capacity and expected load of the volume (e.g., expected iops or MB/s).

At step 1402, management terminal 520 instructs an array controller 110 to allocate the volume by specifying the capacity and the expected load. In the case of the second embodiments, the management terminal 520 may choose an array controller at one of nodes 100 that is able to server as a management node. Alternatively, the instruction to allocate the new volume may be made directly to one of the array controllers from the user or host, thereby bypassing the management terminal 520.

At step 1403, array controller 110 converts the specified load to an expected temperature. For example, array controller 110 may utilize access information 202 and heat information 205 for estimating an expected temperature at a location if the volume having the specified load is added to that location. In this case, array controller 110 acquires relation information between the load and the resulting temperature by checking the correspondence of data collected in access information 202 and heat information 205, and then applies the relation information for obtaining the expected temperature from the specified load.

At step 1404, array controller 110 seeks an available (unused) and otherwise proper location for the volume by using volume information 203, area information 204 and heat information 205. In other words, array controller 110 looks for a location according to the applicable rule of heat distribution that also has sufficient available capacity.

At step 1405, if array controller 110 finds a suitable location for the new volume, the process goes to step 1406. If not, the process goes to step 1407.

At step 1406, array controller 110 allocates the volume in the location and updates volume information 203 accordingly.

At step 1407, array controller 110 reports the failure to obtain a proper location for the new volume to management terminal 520.

At step 1408, array controller 110 selects a location for the volume as the next best according to the rule of heat distribution. Then, array controller 110 allocates the volume in the location and updates the Volume information 203 accordingly.

At step 1409, array controller 110 reports the completion of preparation for the new volume and the information regarding the new volume such as the location, path and LUN (logical unit number) to management terminal 520 or host 500.

At step 1410, host 500 starts to use the new volume. Thus, with the above method, the new volume can be allocated according a rule of heat distribution described in the area information 204. In the above process, expected temperature may be specified by management terminal 520 or host 500 instead of specifying expected load, and as an alternative method, conversion between load and temperature may be performed by management terminal 520 or host 500, or the like.

The present invention enables more efficient cooling in a storage system or a facility having a number of storage systems. A user or manager of the storage system or facility can specify a rule of preferred heat distribution according to the design of the facility and the arrangement of equipment and cooling systems in the facility. When a storage system of the invention detects a heat distribution that varies from the rule currently in force, the storage system adjusts the heat distribution by moving volumes. Thus, the invention includes the ability to define various rules of heat distribution regarding storage systems, and to adjust the heat distribution based on the rules for achieving more efficient cooling in a data center or other facility.

From the foregoing, it will be apparent that the invention provides methods and apparatuses for improving cooling efficiency and reducing power consumption in facilities housing storage equipment. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. An information system comprising:

a storage system including a controller in communication with a plurality of storage devices, said plurality of storage devices being divided into at least a first group and a second group, wherein there are a plurality of said first groups and a plurality of said second groups;

a plurality of first temperature sensors, each of which senses a first temperature condition for the first group; and a plurality of second temperature sensors, each of which senses a second temperature condition for the second group, wherein a heat distribution rule designates said first groups to be high temperature groups and said second groups to be low temperature groups, wherein the heat distribution rule is implemented by migrating data with higher load of input/output (I/O) operations to the high temperature groups than to the low temperature groups so that said plurality of first temperature sensors maintain a higher temperature than said plurality of second temperature sensors.

2. An information system according to claim 1, further comprising:

a first volume logically configured from the first group of storage devices storing first data that is a target of first input/output (I/O) operations; and a second volume logically configured from the second group of storage devices, wherein, when a heat distribution determined from the first temperature condition and the second temperature condition is not in conformance with a predetermined rule for heat distribution, the controller migrates the first data to the second volume as a new target of the first I/O operations for bringing the heat distribution into conformance with the rule.

3. An information system according to claim 2, wherein, when the storage system receives a write request targeting the first volume during migration of the first data to the second volume, the controller is configured refer to a copy pointer to determine whether the portion of the first volume that is a target of the write request has been copied to the second volume, and wherein, when the portion of the first volume that is the target of the write request has already been copied to the second volume, the controller is configured to write to both the first volume and the second volume when carrying out the write request.

4. An information system according to claim 1, wherein the high and low temperature groups are arranged according to the rule such that one of said high temperature groups is surrounded by low temperature groups on four sides of said one high temperature group and one of said low temperature groups is surrounded by high temperature groups on four sides of said one low temperature group.

5. An information system according to claim 1, wherein there are a plurality of said first groups and a plurality of said second groups, and wherein a predetermined heat distribution rule designates the first groups to be high temperature groups and the second groups to be low temperature groups, the high temperature groups being arranged according to the rule in one area of the storage system, and the low temperature groups being located in another area.

6. An information system according to claim 1, wherein each of said first group and said second group is a parity group configured according to a RAID configuration.

7. An information system comprising:

a storage system including a controller in communication with a plurality of storage devices, said plurality of storage devices being divided into at least a first group and a second group;

a first temperature sensor for sensing a first temperature condition for the first group;

a second temperature sensor for sensing a second temperature condition for the second group; and a computer in communication with the storage system via a network, the computer requesting allocation of a new volume for storing data, wherein the storage system is configured to determine whether to allocate the new volume from the first group or the second group based upon a heat distribution rule for the first and second groups and an estimated temperature based on an estimated access load on the new volume.

8. An information system according to claim 7, further comprising:

a first volume logically configured from the first group of storage devices storing first data that is a target of first input/output (I/O) operations; and a second volume logically configured from the second group of storage devices, wherein, when a heat distribution determined from the first temperature condition and the second temperature condition is not in conformance with a predetermined rule for heat distribution, the controller migrates the first data to the second volume as a new target of the first I/O operations for bringing the heat distribution into conformance with the rule.

9. An information system according to claim 8, wherein, when the storage system receives a write request targeting the first volume during migration of the first data to the second volume, the controller is configured refer to a copy pointer to determine whether the portion of the first volume that is a target of the write request has been copied to the second volume, and wherein, when the portion of the first volume that is the target of the write request has already been copied to the second volume, the controller is configured to write to both the first volume and the second volume when carrying out the write request.

10. An information system according to claim 7, wherein there are a plurality of said first groups and a plurality of said second groups, wherein a heat distribution rule designates said first groups to be high temperature groups and said second groups to be low temperature groups, and wherein the heat distribution rule is implemented by assigning a higher load of input/output (I/O) operations to the high temperature groups than to the low temperature groups.

11. An information system according to claim 7, wherein each of said first group and said second group is a parity group configured according to a RAID configuration.

12. A method for heat distribution management in an information system comprising:

establishing a rule for heat distribution in which one or more first locations are designated as low temperature locations and one or more second locations are designated as high temperature locations;

monitoring a load of I/O operations on storage volumes at least at said one or more first locations;

monitoring a temperature condition at each of the first and second locations;

migrating data from a first storage volume having a high load at one of the low temperature locations to an available second storage volume at one of the high temperature locations to decrease the temperature condition at said one of said low temperature locations in conformance with the rule;

requesting allocation of a new volume for storing data; and determining whether to allocate the new volume at one of the first locations or one of the second locations based upon the rule for heat distribution and an estimated temperature based on an estimated access load on the new volume.

13. A method according to claim 12, wherein the low temperature locations are a plurality of first parity groups comprised of a first plurality of disk drives and the high temperature locations are a plurality of second parity groups comprised of a second plurality of disk drives, and wherein the step of monitoring a temperature condition at each of the first and second locations includes receiving temperature readings from sensors on the disk drives.

14. A method according to claim 12, wherein the low temperature locations are a plurality of first storage systems, each comprised of a controller and a plurality of disk drives and the high temperature locations are a plurality of second storage systems, each comprised of a controller and a plurality of disk drives, and wherein the step of migrating data from the first storage volume having a high load at one of the first locations to an available second storage volume comprises migrating the data from a first storage system of the plurality of first storage systems to a second storage system of the plurality of second storage systems.

15. A method according to claim 12, further comprising a step of arranging the high temperature locations and the low temperature locations according to the rule such that one of said high temperature locations is surrounded by low temperature locations on four sides of said one high temperature location and one of said low temperature locations is surrounded by high temperature locations on four sides of said one low temperature location.

16. A method according to claim 12, further comprising a step of arranging the high temperature locations and the low temperature locations according to the rule such that the high temperature locations are arranged in one area, and the low temperature locations are arranged in another area.

* * * * *